(12) United States Patent
Shea et al.

(10) Patent No.: US 8,789,715 B2
(45) Date of Patent: Jul. 29, 2014

(54) COLLAPSIBLE STORAGE CONTAINER

(75) Inventors: Daniel Shea, Farmington Hills, MI (US); Tomohito Hashikawa, Farmington Hills, MI (US); Martin Petersen, Farmington Hills, MI (US); Angelo Parisi, Farmington Hills, MI (US); Hugh Francis, Farmington Hills, MI (US); Kelly Schlotterer, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 1220 days.

(21) Appl. No.: 12/201,854

(22) Filed: Aug. 29, 2008

(65) Prior Publication Data

US 2010/0051616 A1    Mar. 4, 2010

(51) Int. Cl.
*B65D 6/18* (2006.01)
*B65D 6/16* (2006.01)
*B60R 7/02* (2006.01)
*B65D 81/38* (2006.01)

(52) U.S. Cl.
CPC . *B65D 11/18* (2013.01); *B60R 7/02* (2013.01); *B65D 81/3823* (2013.01)
USPC .................................. 220/4.29; 220/6; 220/7

(58) Field of Classification Search
USPC ................. 220/4.28, 6, 7, 9.2, 9.3, 666, 4.29; 206/600
See application file for complete search history.

(56) References Cited

U.S. PATENT DOCUMENTS

| | | | | |
|---|---|---|---|---|
| 1,001,051 A | * | 8/1911 | Kohout | 220/6 |
| 1,007,035 A | * | 10/1911 | Kohout | 220/7 |
| 2,332,642 A | * | 10/1943 | Johnson | 40/787 |
| 3,850,006 A | | 11/1974 | Redfern et al. | |
| 3,858,405 A | | 1/1975 | Manzke | |
| 4,103,510 A | | 8/1978 | Hall | |
| 4,765,151 A | | 8/1988 | Bessey | |
| 4,823,554 A | | 4/1989 | Trachtenberg et al. | |
| 5,036,979 A | * | 8/1991 | Selz | 206/512 |
| 5,099,649 A | | 3/1992 | Zorn | |
| 5,181,555 A | * | 1/1993 | Chruniak | 165/41 |
| 5,319,937 A | | 6/1994 | Fritsch et al. | |
| 5,987,891 A | | 11/1999 | Kim et al. | |
| 6,026,978 A | * | 2/2000 | Clegg et al. | 220/592.1 |
| 6,116,674 A | | 9/2000 | Allison et al. | |
| 6,119,463 A | | 9/2000 | Bell | |
| 6,241,137 B1 | | 6/2001 | Corr | |
| 6,282,906 B1 | | 9/2001 | Cauchy | |
| 6,315,151 B1 | * | 11/2001 | Hupp et al. | 220/666 |
| 6,502,885 B1 | | 1/2003 | Gammon et al. | |
| 6,629,430 B2 | | 10/2003 | Mills et al. | |
| 6,682,118 B2 | | 1/2004 | Ryan | |
| 6,763,666 B2 | | 7/2004 | Fong | |
| 7,066,363 B2 | | 6/2006 | Lecoq | |
| 7,104,580 B2 | | 9/2006 | Clark et al. | |

(Continued)

*Primary Examiner* — Jeffrey Allen
(74) *Attorney, Agent, or Firm* — Young, Basile, Hanlon & MacFarlane, P.C.

(57) ABSTRACT

A collapsible container includes a bottom wall and a plurality of sidewalls. At least two of the side walls include a rigid first segment and a rigid second segment coupled to the first segment by a pivot to permit the side wall to fold so that the first segment and second segment form an acute angle or are parallel when the container is collapsed. The collapsible container can be configured in a storage configuration for containing objects or a collapsed configuration occupying less volume than the storage configuration for stowing the container.

21 Claims, 5 Drawing Sheets

(56) References Cited

U.S. PATENT DOCUMENTS

| | | |
|---|---|---|
| 7,337,914 B2 | 3/2008 | Spindel et al. |
| 7,347,164 B2 | 3/2008 | Axelrod et al. |
| 2003/0029187 A1 | 2/2003 | Mills et al. |
| 2004/0232146 A1* | 11/2004 | Kessler et al. .................. 220/6 |
| 2005/0279124 A1 | 12/2005 | Maldonado |
| 2006/0231716 A1 | 10/2006 | Liu et al. |
| 2007/0108204 A1* | 5/2007 | Warhurst et al. ................ 220/6 |
| 2007/0137222 A1 | 6/2007 | Kastanek et al. |

\* cited by examiner

COLLAPSIBLE STORAGE CONTAINER

FIELD OF INVENTION

The present invention relates to a collapsible storage container.

BACKGROUND

Containers are used for storing various objects, for example foods and beverages, toys, files and other documents, and sporting equipment. Some containers designed for storing foods and beverages are thermally insulated, as many foods and beverages are best when consumed at a certain temperature. These types of containers are commonly known as coolers. Storing foods and beverages in a cooler allows traveling, for example driving with the cooler in a vehicle to a beach or a tailgate party, while maintaining the foods and beverages at a substantially constant temperature.

One type of conventional cooler is a rigid insulated box. This type of cooler occupies the same amount of space whether in use or not in use. As a result, a cooler of this type is cumbersome to store when not in use. Another type of conventional cooler is collapsible in order to occupy a smaller volume when not in use than when in use for storage purposes. However, this type of cooler has flexible side walls that do not offer much protection in the event the collapsible cooler is dropped or struck by an object, for example.

SUMMARY

Embodiments of a collapsible storage container are described herein. In one of the disclosed embodiments, the container includes a bottom wall and a plurality of side walls. At least two of the side walls include a rigid first segment and a rigid second segment. The second segment is coupled to the first segment by a pivot, permitting the side wall to fold so that the first segment and second segment form an acute angle or are parallel when the container is collapsed.

In another illustrative embodiment, a collapsible storage container includes a bottom wall and a plurality of side walls pivotally coupled to the bottom wall. Each side wall is comprised of a rigid lower wall segment and a rigid upper wall segment. The rigid lower wall segment has a first end pivotally coupled to the bottom wall and a second end spaced apart from the first end. The rigid upper wall segment has a hinged end pivotally coupled to the second end of the lower wall segment and a distal end spaced apart from the hinged end. The storage container is configurable in a storage configuration wherein the distal ends of the upper wall segments are positioned a first distance from the bottom wall and a collapsed position wherein the distal ends of the upper wall segments are positioned a second distance from the bottom wall. The second distance is less than the first distance.

In a third illustrative embodiment, a collapsible container includes a bottom wall, a pair of end walls, and a pair of lateral walls. Each end wall includes a rigid lower wall segment having a first end pivotally coupled to the bottom wall and a second end spaced apart from the first end of the lower wall segment, and each end wall includes a rigid upper wall segment having a hinged end pivotally coupled to the second end of the lower wall segment and a distal end spaced apart from the hinged end of the upper wall segment. Each lateral wall includes a rigid lower wall segment having a first end pivotally coupled to the bottom wall and a second end spaced apart from the first end of the lower wall segment, and each lateral wall includes a rigid upper wall segment having a hinged end pivotally coupled to the second end of the lower wall segment and a distal end spaced apart from the hinged end of the upper wall segment. A plurality of attachment members are included, and each attachment member couples the distal end of the upper wall segment of each end wall to the distal end of the upper wall segment of one of the lateral walls. The storage container is configurable in a storage configuration wherein the distal ends of the upper wall segments of the end walls and lateral walls are positioned a first distance from the bottom wall and a collapsed configuration wherein the distal ends of the upper wall segments of the end walls and lateral walls are positioned a second distance from the bottom wall. The second distance is less than the first distance.

DESCRIPTION OF DRAWINGS

The description herein makes reference to the accompanying drawings wherein like reference numerals refer to like parts throughout the several views, and wherein.

DETAILED DESCRIPTION

Figure 1:
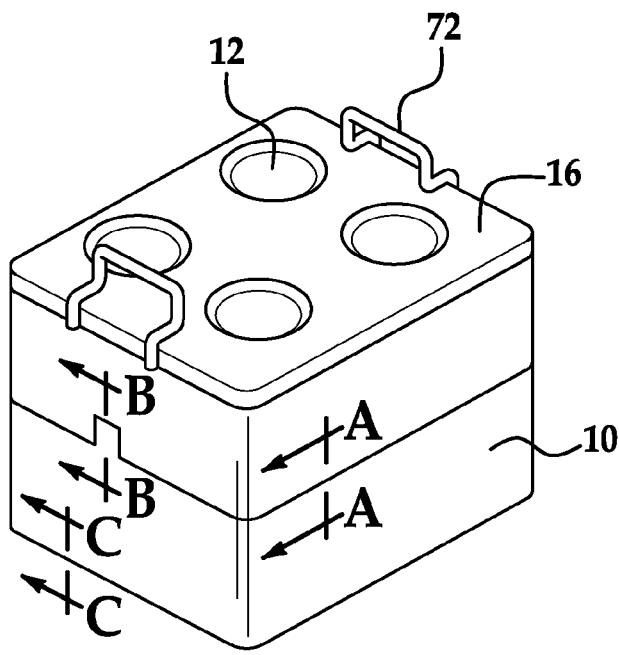
FIG. 1 is a perspective view of a container according to the present invention.
Figure 6A:
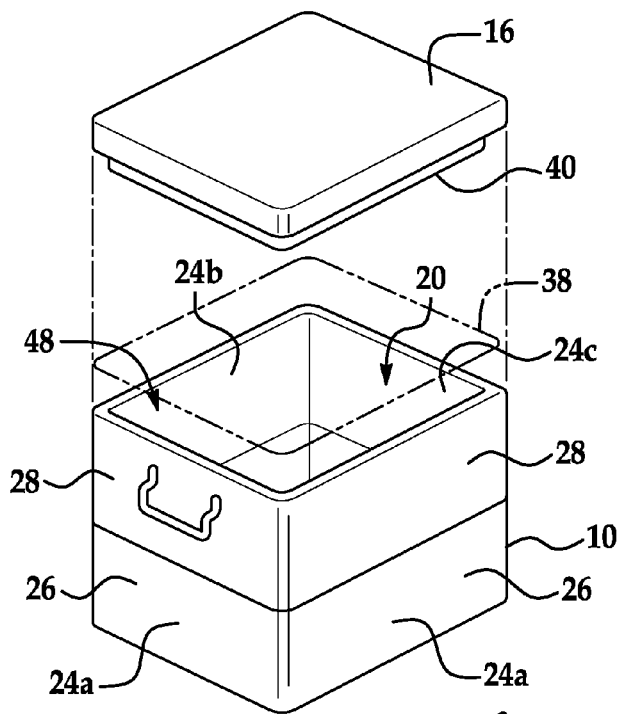
FIG. 6A-C are perspective views of a container according to the present invention in a storage configuration, a partially collapsed configuration, and a fully collapsed configuration, respectively.

FIG. 1 illustrates a container 10 along with an optional removable lid 16. The lid 16 can be used when transporting the container 10 outside of a vehicle, such as when using the container 10 on a beach, though the lid 16 can also be used while the container 10 is in a vehicle. As shown in FIG. 6A, the container 10 defines an opening 20 and a cavity 48 accessible through the opening 20 for storing, for example, foods and beverages.

Also as shown in FIG. 6A, the lid 16 can include a nesting projection 40 that can be inserted into the opening 20 of the container 10 for enclosing the cavity 48. The nesting projection 40 can have the same shape as the opening 20, and the nesting projection 40 can extend a distance, e.g., 0.5" or 1.0", from the underside of the lid 16 to engage the interior of the container 10. A seal can circumscribe the nesting projection 40.

Referring back to FIG. 1, pivotable handles 72 can be positioned to engage the top of the lid 16 to hold the lid 16 against the container 10. The lid 16 can include handles 72 without a nesting projection 40 or vice versa. Alternatively, the lid 16 can be secured to the container 10 with a different structure. For example, the container 10 can include a track near the opening 20, and the lid 16 can be slidably engaged with the track. As another example, the lid 16 can be attached to the container 10 with a detachable latch. Also, the lid 16 and container 10 need not be separate; the lid 16 can be pivotally coupled to the container 10 if desired.

Still referring to FIG. 1, the lid 16 can define cup-holders 17 for holding beverages or other items. Alternatively, the lid 16 can define other shapes, such as a recessed tray for holding food and other items. The lid 16 can be constructed from a material that is thermally insulating and sufficiently rigid to protect the contents of the container 10 from damage resulting from an impact, such as an ABS plastic shell with a polyurethane foam interior. Additional lid 16 materials can include other polymers, composites, and metals. The lid 16 does not necessarily have to be rigid as mentioned above. For example, a thermally insulated flap can function as a lid. Also, the lid 16 can include additional features. For example, the lid 16 can include a thermometer and a display indicating the temperature inside the container 10, or the lid 16 can include an integral reusable ice pack to enable the lid 16 to actively cool the contents of the container 10.

Figure 2:
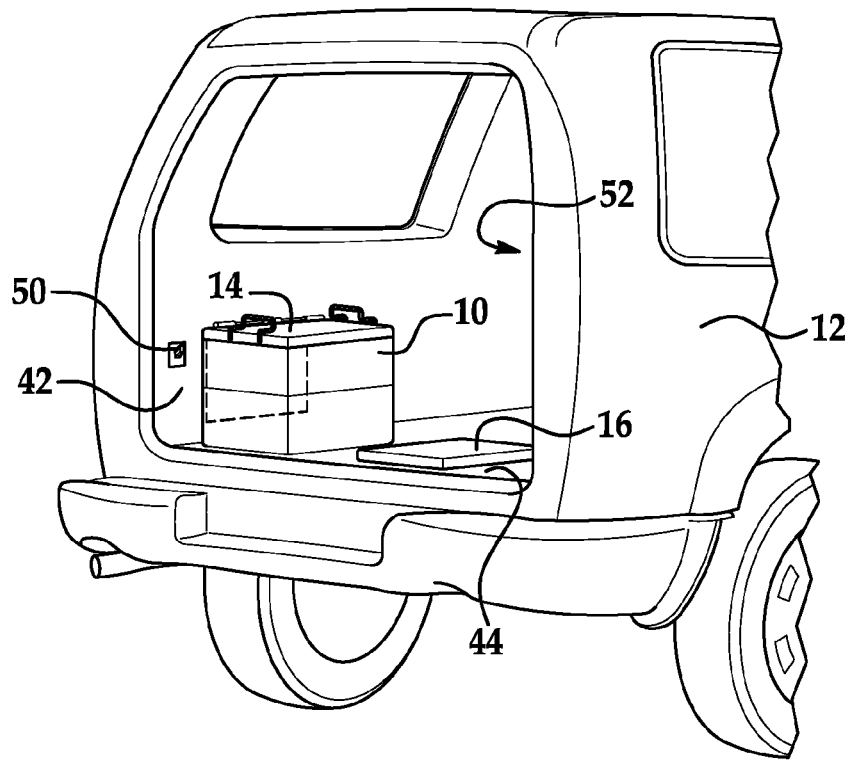
FIG. 2 is a perspective view of the container of FIG. 1 attached to a thermoelectric lid coupled to a vehicle.

As shown in FIG. 2, the container 10 can rest on a floor 44 of an interior compartment 52 of a vehicle 12 for engagement with another lid 14, which can enclose a thermoelectric device fixed to the vehicle 12. The container 10 can rest on a different portion of the vehicle 12 from the floor 44, such as an indent in the floor 44 or a platform above the floor 44. The interior compartment 52 can be for example, the trunk of a sedan or the storage area of a van or SUV. Additionally, the container 10 can be engaged by a portion of the vehicle 12 outside the interior compartment 52. For example, if the vehicle 12 is a pick-up truck, a vehicle structure (discussed in more detail below) in the bed of the truck can engage the container.

The thermoelectric device in the lid 14 can include Peltier elements, such as p-type silicon and n-type silicon. The Peltier elements can be coupled to a heat sink and a fan to force convection to heat or cool the container 10, though heat transfer other than by forced convection may be sufficient to heat and/or cool the container without a heat sink and/or fan. The lid 14 can also include additional structures, such as a thermometer to measure the temperature in the container 10 and a controller to control the thermoelectric device. Reversing the current applied to the Peltier elements allows the thermoelectric device to provide either cool or warm air. However, if desired, the lid 14 can include a traditional refrigeration and heat pump system including a compressor, evaporator, condenser, and expansion valve, or another type of heating and/or cooling system. Further, instead of the Peltier elements for heating and/or cooling, the lid 14 can contain another device. For example, the lid 14 can contain a light, a battery charger, a water purification system, or another device.

The lid 14 can be electrically connected to a vehicle battery, avoiding the need for a separate power supply for the lid 14. Wiring can be run internally of an interior panel 42 (e.g., a panel forming an interior wall or the floor 44 of the vehicle 12) to avoid exposed wiring. In this manner, the lid 14 can draw power from a battery of the vehicle 12 even when the vehicle 12 is not running, i.e., when the vehicle 12 is in an "Off" state. Additionally, the vehicle 12 can include a controller to regulate the amount of power drawn by the lid 14. For example, the controller receive a signal from a battery monitor, and the controller can reduce the amount of power provided to the lid 14 (e.g., by turning the lid 14 off) in the event the lid 14 is running when the amount of energy remaining in the vehicle battery is below a predetermined amount and the vehicle engine is not running, thereby preventing the vehicle battery from becoming too drained to start the vehicle 12. As another example, the controller can receive a signal from a gasoline monitor, and the controller can reduce the amount of power provided to the lid 14 when the amount of gasoline remaining is below a predetermined amount, thereby reducing the load on the vehicle engine to increase the efficiency of the vehicle 12. Also, the lid 14 can include its own power supply, such as a battery or solar panel, in addition to or as an alternate for power supplied by the vehicle battery.

Current flowing through the Peltier elements can be adjusted to vary the magnitude of heating or cooling. A switch 50 on the internal panel 42 of the vehicle 12 can be used to control power to the lid 14 as shown in FIG. 2, and the switch 50 can include multiple settings such as "Heat", "Cool", and "Off". The switch 50 can additionally or alternatively include multiple temperature settings, such as "high", "medium", and "low", or allow a user to set a specific temperature. The switch 50 can alternatively be located at another location in the vehicle 12, such as an instrument panel or the thermoelectric lid 14. Alternatively, a switch can be located on the container 10.

Still referring to FIG. 2, the thermoelectric lid 14 can be sized to enclose the opening 20 of the container 10. Similar to the lid 16 including the nesting projection 40 described above, the thermoelectric lid 14 can include a nesting projection or other structure for attachment to the container 10. Additionally, the handles 72 coupled to the container 10 can be rotated to secure the thermoelectric lid 14 over the opening of the container 10. Also as described above in reference to the lid 16, alternative structures from a nesting projection and handles 72 can be used to secure the lid 14 to the container 10, such as clips or a latch. A seal can be included along an interface between the thermoelectric lid 14 and the container 10. With the lid 14 attached to the container 10, the Peltier elements can be in thermal communication with the cavity 48 of the container 10.

When the lid 14 is engaged with the container 10, the container 10 can be held in a retained position (i.e., a position that limits movement of the container 10 relative to the vehicle 12) by the lid 14 as shown in FIG. 2. When the container 10 and thermoelectric lid 14 are disengaged, the container 10 can be moved. Thus, engagement of the container 10 with the lid 14 can prevent the container 10 from moving during driving, thereby reducing the likelihood of spilling foods or drinks in the container 10. Additionally, the container 10 can be retained in the vehicle 12 by a container attachment member other than the lid 14, such as a clamp, a belt, or another structure. The optional lid 16 can be used when the container is disengaged from the thermoelectric lid 14 if, for example, the thermoelectric lid 14 is permanently coupled to the vehicle 12, as the thermoelectric lid 14 can be configured to disengage from the vehicle 12 as described below.

Figure 3:
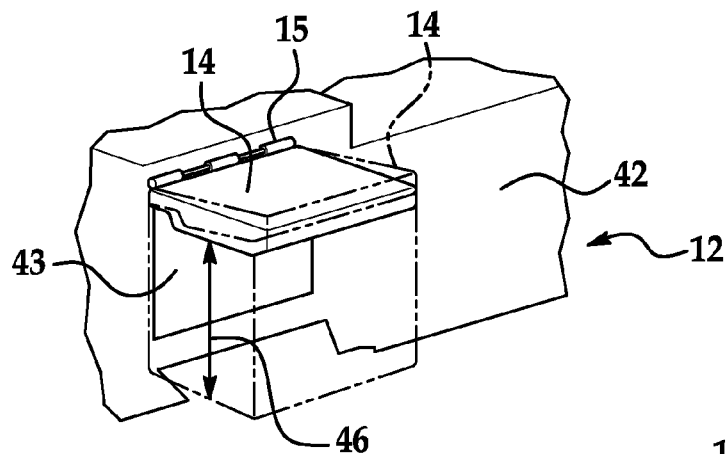
FIG. 3 is a perspective view of the thermoelectric lid of FIG. 2 in a container-engaging position including a phantom of the lid in a container-accepting position.
Figure 4:
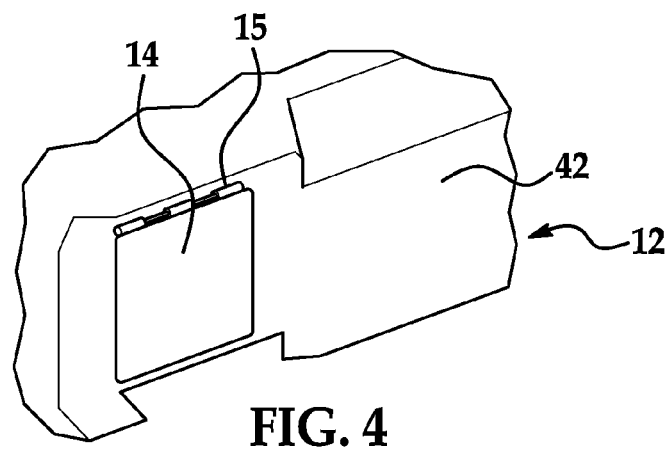
FIG. 4 is a perspective view of the thermoelectric lid of FIG. 2 in a stowed position.

The thermoelectric lid 14 can be pivotally mounted to the interior vehicle panel 42 by a hinge 15 for rotation between a first position, a second position, and a third position. FIG. 3 illustrates the lid 14 oriented horizontally in the first position (hereinafter referred to as the horizontal position) and in phantom in the second position. That is, in the second position, a distal end of the lid 14 can be higher then the distal end of the lid in the first position. FIG. 4 illustrates the lid 14 oriented vertically in the third position (hereinafter referred to as the vertical position), with the distal end of the lid 14 lower than the hinged end of the lid.

When in the horizontal position as shown in FIG. 3, the thermoelectric lid 14 is spaced from the floor 44 of the vehicle 12 by a distance 46 corresponding to a height of the container 10, though the thermoelectric lid 14 can be pivotable beyond the horizontal position to the second position as shown in phantom in order to slide the container 10 between the floor 44 and the thermoelectric lid 14. For example, the lid 14 can be pivotable beyond horizontal by a distance sufficient for a nesting projection of the lid 14 to be above the top of the container 10. As a result, the second position allows the thermoelectric lid 14 to be engaged with the container 10. A spring can be coupled to the thermoelectric lid 14 to bias the lid 14 toward the horizontal position from the second position. Also, the lid 14 need not be exactly horizontal while in the first position. Instead, the lid 14 can be tilted from the horizontal in the first position so long as the lid 14 can engage the container 10. For example, if a top surface of the container 10 is not level, the lid 14 can be tilted from the horizontal while in the first position. Further, the interior vehicle panel 42 can be contoured to the shape of the container 10 such that the container 10 snuggly fits against the panel 42 when engaged with the lid 14. For example, at least a portion the panel 42 near the thermoelectric lid 14 can be substantially vertical if the sides of the container 10 extend substantially vertically.

When in the vertical position as illustrated in FIG. 4, the thermoelectric lid 14 can be stowed against the interior panel 42 of the vehicle. If desired, the interior panel 42 can include an indent 43 as shown in FIG. 3 such that the lid 14 is substantially flush with the interior panel 42 when in the vertical position. Additionally, if the lid 14 includes a nesting projection similar to the projection 40 on lid 16, the indent 43 can include a recess sized to receive the nesting projection to hold the lid 14 against the vehicle panel 42. The thermoelectric lid 14 can be automatically turned off whenever the lid 14 is in the vertical position. Additionally, the lid 14 can be retained in the vertical position by, for example, a snap fit or friction fit between the lid 14 and the interior panel 42. Thus, if a spring biases the lid 14 toward the horizontal position as described above, the lid 14 automatically pivots to the horizontal position once disengaged from the vertical position. Then, a user can pivot the lid 14 back to the vertical position and engage the lid 14 with the panel 42 to retain the lid 14 in the vertical position. Alternative forces can be applied to the thermoelectric lid 14. For example, a spring can be included for urging the lid 14 toward the vertical position, or the lid 14 can be freely movable.

While the lid 14 is described above as being pivotally mounted to the interior panel 42 of the vehicle 12, the lid 14 can alternatively be connected to another vehicle structure. For example, the vehicle structure can be part of a bed of a truck, a roof rack, a seat, a center console, a trunk lid if the vehicle 12 is a car or a lift gate if the vehicle 12 is an SUV, or another portion of the vehicle. The vehicle structure can be a portion of the vehicle 12 as originally manufactured, or the vehicle 12 can be retrofit to include the vehicle structure. For example, the vehicle structure can be an aftermarket bracket attached to the vehicle 12 for the purpose of mounting the lid 14. Additionally, the lid 14 can be coupled to the vehicle 12 with a structure other than the hinge 15, such as a detachable snap-fit coupling including an electric connection between the lid 14 and vehicle 12, or a slidable engagement between the lid 14 and a track included on the vehicle 12. Depending on the structure for coupling the lid 14 to the vehicle structure, the first and second positions of the lid 14 can be different from illustrated, so long as the lid 14 can engage the container 10 in the first position and be disengaged from the container 10 in the second position. Further, the container 10 need not be moveable to the third position.

Figure 5:
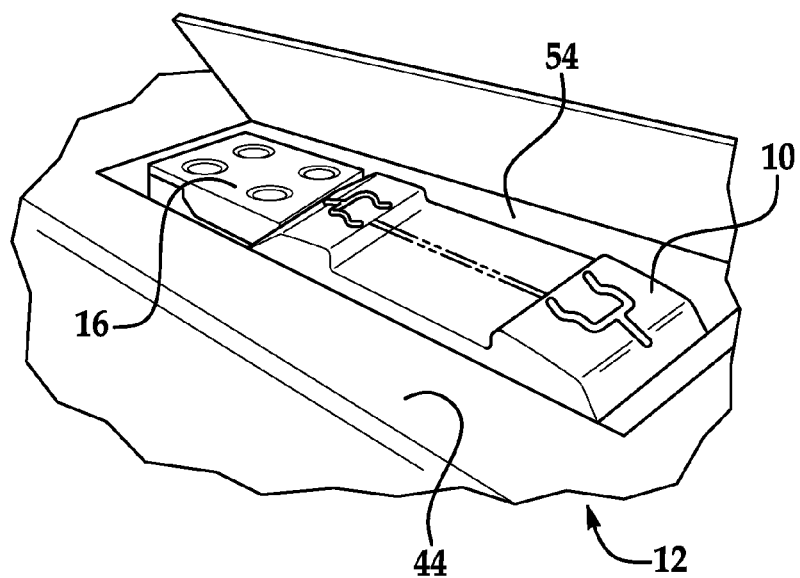
FIG. 5 is a perspective view of a collapsed container according to the present invention stowed in a vehicle storage compartment along with a lid.

As illustrated in FIG. 5, the vehicle 12 can additionally include a storage compartment 54. The storage compartment 54 can be in the storage area, e.g., the trunk, of the vehicle 12. The storage compartment 54 can include an area designed to hold the removable lid 16, an area designed to hold the container 10 when collapsed, and/or an area design to hold the lid 14 if it is removable from the vehicle 12. If multiple storage areas are included, the areas can be side-by-side, stacked vertically, or have another configuration. Alternatively, the storage compartment 54 can be sized to hold only the container 10 if, for example, the lid 14 is not detachable from the vehicle 12 and a lid 16 is not included.

Figure 6B:
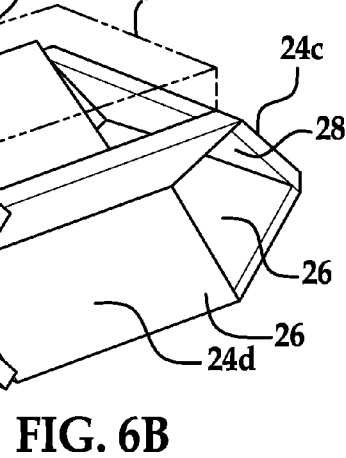
Figure 6C:
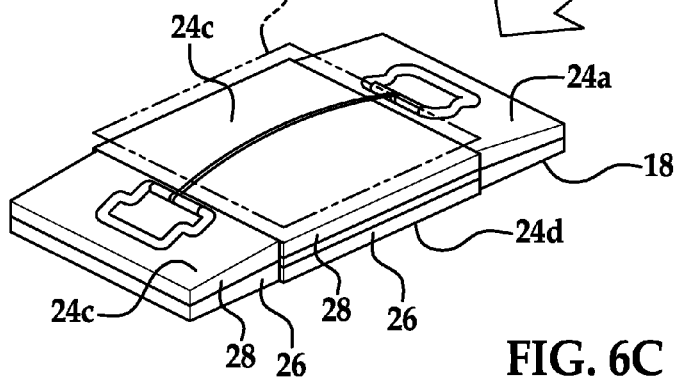

The general structure and function of the container 10 are first described with reference to FIGS. 6A-C, with the structure of the container 10 later described in greater detail with reference to FIGS. 7-11. FIGS. 6A-C illustrate the container 10 in a storage configuration, a partially collapsed configuration, and a collapsed configuration, respectively. The container 10 as shown includes four side walls 24a-d, which can define a generally rectangular shape 38 regardless of the configuration of the container 10. Alternatively, a container can have three side walls or more than four side walls. Each side wall 24a-d can include a first, lower segment 26 and a second, upper segment 28.

As shown in FIG. 6A, the container 10 is in the upright configuration, with each side wall 24a-d having its lower and upper segments 26 and 28 aligned vertically (i.e., the segments 26 and 28 are parallel). However, depending on the design of the container 10, the segments 26 and 28 need not be parallel when the container 10 is in the upright configuration; for example, the segments 26 and 28 can form an obtuse angle when the container 10 is in the storage configuration.

As shown in FIG. 6B, the two end side walls 24a and 24c are in the process of collapsing outward, while the two lateral side walls 24b and 24d are collapsing inward. (The terms outward and outboard refer to a direction away from the center of the container 10, while the terms inward and inboard refer to a direction toward the center of the container 10). Each upper segment 28 can be coupled to the adjacent upper segments 28 such that all side walls 24a-d collapse simultaneously as shown in FIG. 6B and described below in greater detail.

As shown in FIG. 6C, the container 10 is collapsed with each side wall 24a-d folded such that its lower segment 26 faces its upper segment 28. That is, the inboard surfaces of the outwardly folding segments 24a and 24c are acutely angled, and the outboard surfaces of the inwardly folding segments 24b and 24d are acutely angled. Depending on the design of the container 10, the segments 26 and 28 can be parallel. That is, when the container 10 is collapsed, the segments 26 and 28 can be acutely angled or parallel, depending on the design of the container 10. Further, the distal or top end of each upper segment 28 is substantially adjacent (i.e., positioned near) to the end of the lower segment 26 hinged to the bottom 22 when the container 10 is collapsed. The closer together the top end of the upper segment 28 to the end of the lower segment 26 hinged to the bottom 22, the smaller the angle between the segments 26 and 28 and the smaller the height of the container 10 in the collapsed configuration. The container 10 can be fully collapsed when two portions that pivot relative to one another, e.g., segments 26 and 28, come into contact. Additionally, the container 10 can include bosses intended to limit collapsing of the container 10 in order to avoid stress on hinges or other parts of the container 10.

The container 10 in the collapsed configuration as shown in FIG. 6C can have a lower height than the container 10 in the storage configuration as shown in FIG. 6A, thereby reducing the volume occupied by the container 10 when in the collapsed configuration. The total difference in height between the storage and collapsed configurations can vary depending on the design of the container 10.

A user can collapse the container 10 by pushing side walls 24a-d inward or outward, depending on the configuration of the side wall 24a-d. However, the container 10 can collapse in a different manner. For example, all four side walls 24a-d can collapse outward, or two side walls 24a and 24c and a bottom wall 22 of the container 10 can collapse while the other two side walls 24b and 24d remain rigid, in which cases the rectangular shape 38 would not be maintained at all container configurations.

The container 10 can be designed as a cooler or an insulated shipping container. In this case, the bottom 22 and side walls 24a-d can be formed from a thermally insulating material that is sufficiently rigid to protect the contents of the container 10 from damage resulting from an impact, such as an ABS plastic shell with a polyurethane foam interior. Alternatively, other materials including polymers, composites, and metals can be used to construct the container 10. The container 10 can be designed for other uses, such as organizing items in a vehicle. Accordingly, the container 10 need not necessarily be thermally insulating.

Figure 7:
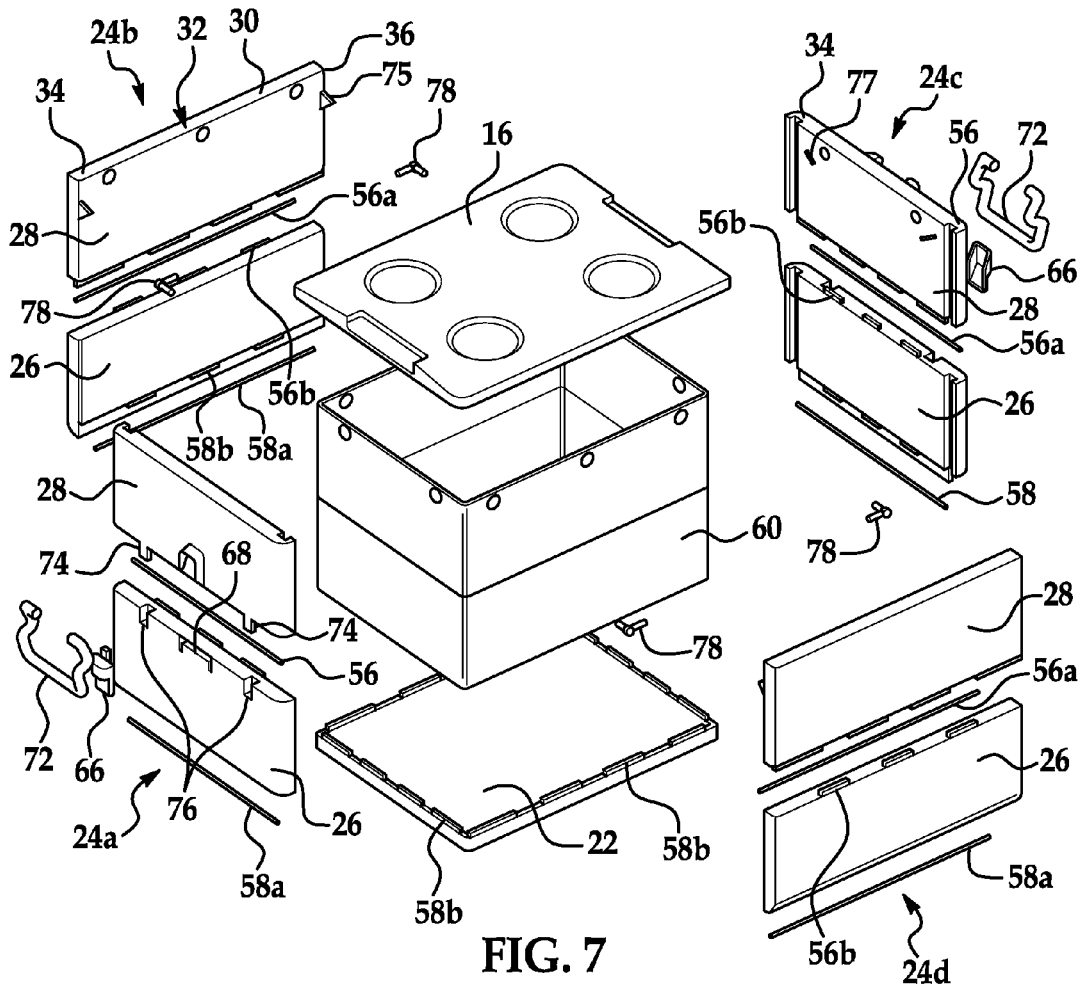
FIG. 7 is an exploded view of a collapsible container according to the present invention.

FIG. 7 illustrates an exploded view of the container 10. The four side walls 24a-d can each consist of a lower segment 26 and an upper segment 28 as mentioned above. However, each side wall 24a-d can consist of more than two segments, such as three segments or four segments. The lower and upper segments 26 and 28 can have the same height to enable the container 10 to retain the rectangular shape 38 at any configuration (e.g., when the container 10 is in the collapsed configuration or when the container 10 is in the storage configuration). Each lower segment 26 can be pivotally coupled to its respective upper segment 28 and the bottom 22, as will be discussed in below in reference to FIGS. 8-10. An upper corner 36 of one side wall, e.g., side wall 24b, can be coupled to an upper corner 34 of its adjacent side walls, side wall 24c in the example, using a joint 78 as described below in reference to FIG. 11. Either lid 14 or 16 can rest on a top surface 32 of each side wall 24a-d when engaged with the container 10.

Two opposing side walls, e.g., outwardly folding side walls 24a and 24c, can each include a handle 72 for carrying the container 10. For example, the handle 72 can be pivotally connected to the outboard side of side walls 24a and 24c. Alternatively, the handle 72 can be molded into the side walls 24a and 24c or otherwise attached to the container 10. Also, all four side walls 24a-d can include handles 72 if desired.

The container 10 can include structures for holding each lower segment 26 relative to its corresponding upper segment 28 when the container 10 is in the storage configuration. For example, still referring to FIG. 7, the upper segment 28 of the outwardly folding side walls 24a and 24c can include a tab 74 on its outboard side projecting toward the lower segment 26, and the lower segment 26 can include a notch 76 on its outboard side sized for a snap-fit engagement with the tab 74. For example, the tab 74 can be a rectangular projection integrally molded with the upper segment 28 and the notch 76 can be a rectangular indentation molded in the lower segment 26, though the tab 74 and notch 76 can have alternative shapes and be formed separately from the segments 26 and 28. The tab 74 and notch 76 can become engaged when the container 10 is moved to the storage configuration to secure the container 10 in the storage configuration, and the tab 74 and notch 76 can easily be disengaged by pushing the side wall 24a outward to overcome the snap-fit. The tightness of the fit between the tab 74 and notch 76 can be varied to control the amount of force required to separate the segments 26 and 28 and thus to collapse or right the container 10.

In alternative to the above described tab 74 and notch 76 locations, the tab 74 and notch 76 can be positioned at other locations. For example, tabs 74 can project from lower segments 26 and notches 76 can be defined by upper segments 28, or tabs 74 and notches 76 can be on an inboard side of inwardly folding side walls 24b and 24d. Also, alternative and/or additional structures can be used to secure lower segments 26 relative to upper segments 28, such as a latch 66 shown in FIG. 7 and described below in detail with reference to FIG. 9, or a bar coupled to one segment 26 or 28 and slidably engagable with the other segment 26 or 28. However, the container 10 need not include a structure for securing the segments 26 and 28 relative to one another. For example, the lids 14 and 16 can provide sufficient support to hold the container 10 in the storage configuration, or friction in the hinges 56 and 58 may suffice to hold the container 10 static.

Additionally, structures can be used to secure side walls 24a-d relative to other side walls 24a-d when the container 10 is in the storage configuration. For example, still referring to FIG. 7, an angled projection 75 and a catch 77 can be located on an inboard side of an inwardly folding side wall, e.g., side wall 24b, and an inboard side of an adjacent outwardly folding side wall, such as side wall 24c in the example, respectively. Each projection 75 can have a generally triangular shape and be integrally molded with the side wall 24b, and each catch 77 can be a flange integrally formed with the side wall 24c and angled to receive the projection 75 as the container 10 is moved into the storage configuration. The projection 75 and catch 77 can engage in a friction fit when the container 10 is in the storage configuration to secure the container 10 in the storage configuration, and the engagement can be undone by applying a force to the side walls 24a-d to move the container toward the collapsed configuration. The tightness of the fit between the projection 75 and catch 77 can be varied to control the amount of force required to collapse the container 10. Alternatively, other structures can be used to hold the container 10 in the storage configuration, such as the joint 78 shown in FIG. 7 and described in greater detail with reference to FIG. 11. Also, the projection 75 and catch 77 can be located in different positions than illustrated, such as extending from lower segments 26. Further, the container 10 need not include a structure for securing the adjacent side walls 24a-d relative to one another. For example, the lid 16 can provide sufficient support to hold the container 10 in the storage configuration, or friction in the hinges 56 and 58 may suffice to secure the container 10.

An optional, removable watertight liner 60 can be placed in the cavity 48. The watertight liner 60 need not provide structural support for the container 10, since the side walls 24a-d and bottom 22 can provide sufficient strength to the container. The liner 60 can be made from a waterproof fabric, such as a synthetic material. As a result, the container 10 can hold liquid without the need for the side walls 24a-d and bottom 22 to be watertight. The liner 60 can be snapped, clipped, secured using hook-and-loop strips, or otherwise connected to the side walls 24a-d to maintain the position of the liner 60. The liner 60 can also be folded for storage without occupying a large area. Alternatively, seals, e.g., rubber strips, can be placed along the edges of the side walls 24a-d and bottom 22 such that the container 10 is watertight when in the storage configuration.

Figure 8:
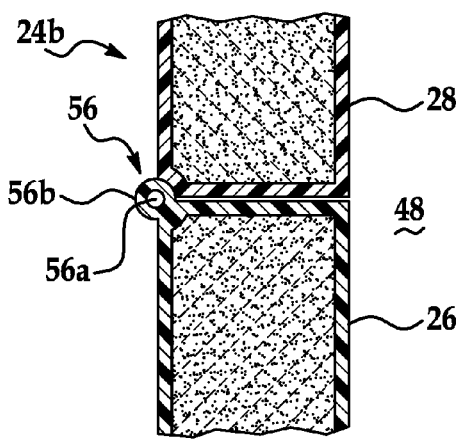
FIG. 8 is a partial view of a cross-section of a hinge connecting two inwardly folding side walls along line A-A in FIG. 1.

FIG. 8 shows inwardly folding side wall 24b in the storage configuration. The other inwardly folding side wall 24d can be a mirror image of the same structure. A piano-type hinge 56 pivotally connects the upper segment 28 to the lower segment 26 such that the segments 26 and 28 can pivot. The hinge 56 can be located on the outboard side of the side walls 24b. More specifically, the hinge 56 can be located with its axis in a plane defined by the outboard surface of the side wall 24b or further outward (i.e., away from the cavity 48). The position of the hinge 56 relative to the outboard surface of the side wall 24b can affect the degree to which the segments 26 and 28 can be pivoted without contacting one another. As a result of locating the hinge 56 in the plane defined by the outboard surface of the side wall 24b or further outward, the two segments 26 and 28 are able to fold inwardly without interfering with each other. Alternatively, the hinge 56 can be located inboard of the position shown in FIG. 8 (i.e., nearer to the cavity 48) if the segments 26 and 28 are shaped (e.g., chamfered) not to contact each other when pivoting into the collapsed configuration. That is, the hinge 56 can be located inboard of the position shown in FIG. 8 if the container 10 is sufficiently collapsed when the segments 26 and 28 contact each other, preventing further collapsing of the container 10, even if the segments 26 and 28 are not parallel.

The hinge 56 as illustrated includes a rod 56a inserted through cylinders 56b formed integrally with the side walls 24a-d. The cylinders 56b can be formed in alternating fashion on the lower segment 26 and upper segment 28 as shown in FIG. 7 such that a continuous cylinder is formed when the segments 26 and 28 are attached with the rod 56a. Other types of pivots, for example C-shaped clips molded at intervals along one of the segments 26 and 28 and corresponding bars molded in the other segment 26 or 28, can be used in place of the illustrated hinge 56. Also, the hinge 56 need not be integral with the side walls 24a-d; separate pivots can be attached to the side walls 24a-d.

Figure 9:
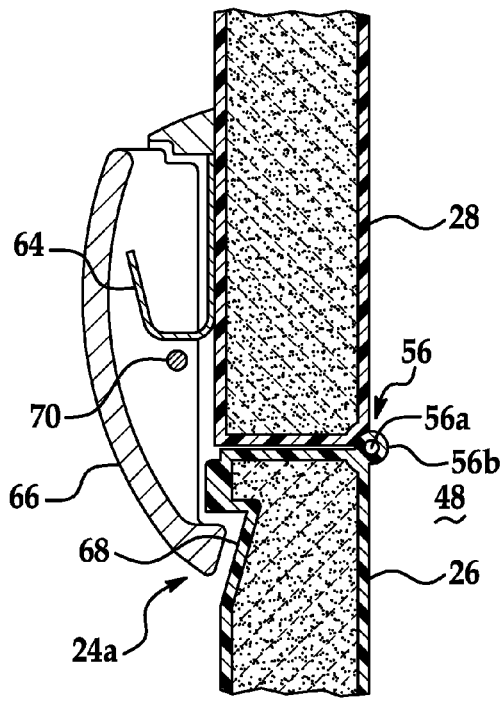
FIG. 9 is a partial view of a cross-section of a hinge connecting two outwardly folding side walls along line B-B in FIG. 1.

FIG. 9 shows outwardly folding side wall 24a. The other outwardly folding side wall 24c can be a mirror image of the same structure. Another piano-type hinge 56 can be used to connect the upper segment 28 and lower segment 26 of the side walls 24a. The hinge 56 can include a bar 56a and cylinders 56b as described above. The hinge 56 can be located on the inboard side of the side wall 24a, and more specifically in line with an inboard surface of the side wall 24a or further inward, to allow the two segments 26 and 28 to fold outwardly without interfering with each other. As described above, other types of pivots can be used in place of the piano-type hinge 56, and the hinge 56 can be positioned at a different location, such as outboard of the position shown depending on the geometry of the side wall 24a. For example, the hinge 56 can be positioned outboard of the position shown in FIG. 9 if the upper segment 28 and lower segment 26 are chamfered to prevent the segments 26 and 28 from contacting each other until the container 10 is fully collapsed, or the hinge 56 can be outboard if the container 10 is sufficiently collapsed even though the segments 26 and 28 are not parallel when the segments 26 and 28 contact each other.

Additionally as shown in FIG. 9, the latch 66 can be included on an outboard side of a side wall, e.g., outwardly folding side wall 24a, for holding the side wall 24a with the lower segment 26 and upper segment 28 aligned substantially in parallel by preventing unintended pivoting of the upper segment 28 and lower segment 26. The latch 66 can be pivotably coupled to the upper segment 28 via a hinge 70. The distal end of the latch 66 can snap into a notch 68 in the lower segment 26 to securely retain the latch 66 in a closed position as illustrated. The latch 66 can be disengaged from the notch 68 by applying a force to the distal end of the latch 66. A spring 64, which can be a coil spring or another type of spring, can be coupled to the latch 66, and the spring 66 can become energized when the latch 66 is pivoted away from the closed position as shown in FIG. 9 to urge the latch 66 back toward the closed position. Since the spring 64 can urge the latch 66 toward the closed position, moving the container 10 to the storage configuration can cause the latch 66 to automatically engage the notch 68. Once the latch 66 is engaged with the notch 68, rotation between the lower and upper segments 26 and 28 can be prevented. Other structures can alternatively be used to keep the container 10 in the storage configuration as described above. Additionally, the latch 66 can be positioned at a different location than illustrated, such as pivotally attached to the lower segment 26. Also, the container 10 need not include the latch 66.

Protective covers (not shown) can be included over each hinge 56 and 58 to prevent objects, e.g., the hands of a user handling the container 10, from being pinched while collapsing or raising the container 10. Gaps can form over the hinges 56 and 58 when the parts coupled to the hinge 56 or 58 are pivoted relative to one another, e.g., when the lower segment 26 and upper segment 28 of the outwardly folding side wall 24a are pivoted from the collapsed configuration to the upright configuration. The covers can each include a strip of resilient material attached to the container 10 along a hinge 56 or 58. The strip should be tensioned such that it is sufficiently taut when the gap over the hinge 56 or 58 is large so as to prevent accidental insertion of an object into the gap. As the container 10 is moved from the collapsed configuration to the storage configuration or vice versa, the gaps in the container 10 can narrow. As a result, even though the strip may not be taut when the container 10 is in or near the storage configuration, the gaps in the container 10 can be sufficiently small to prevent the accidental insertion of objects. Other cover structures can alternatively be included. For example, a spring biased cover can be attached to over a gap. Another structure for avoiding the accidental insertion of an object into a gap is discussed with reference to FIG. 10.

Figure 10:
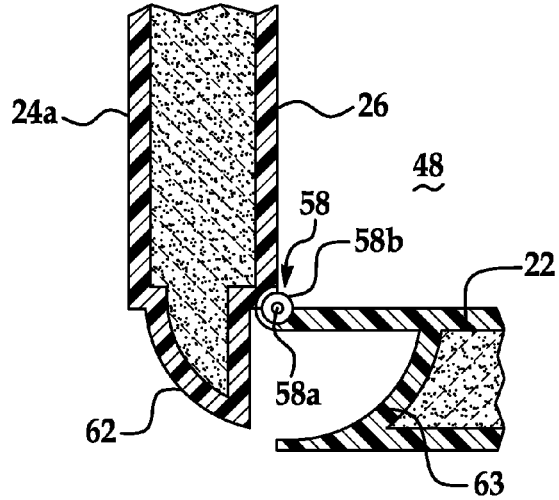
FIG. 10 is a partial view of a cross-section of a hinge connecting an outward folding side wall and a bottom wall along line C-C in FIG. 1.

As shown in FIG. 10, the lower segments 28 are pivotally coupled to the bottom 22 with a piano-type hinge 58. The hinge 58 as illustrated includes a rod 58a inserted through cylinders 58b formed integrally with the side walls 24a-d and bottom 22. The cylinders 58b can be formed in alternating fashion on each lower segment 26 and bottom 22 as shown in FIG. 7 such that a continuous cylinder is formed when the lower segments 26 and bottom 22 are attached with the rod 58a. Other types of hinges, for example C-shaped clips molded at intervals along the lower segments 26 and corresponding bars molded in the bottom 22, can be used in place of the illustrated hinge 58. Also, the hinge 58 need not be integral with the side walls 24a and bottom 22; separate hinges can be attached to the side walls 24a-d and bottom 22.

The lower segment 26 of each side walls 24a and 24c can include a curved edge 62, and sides of the bottom 22 coupled to outwardly folding side walls 24a and 24c can define a notch 63. When the container 10 is changed from the storage configuration to the collapsed configuration, the curved edge 62 can nest in the notch 63 to prevent interference between the lower segment 26 of the side walls 24a and the bottom 22. Additionally, the curved edge 62 can act as a protective cover when the container is in the upright configuration; i.e., the curved edge 62 can cover the notch 63 to prevent the accidental insertion of an object between the lower segment 26 and bottom 22. As a result, when the container 10 is collapsed, the curved edge 62 can prevent an object from being pinched between the lower segment 26 and bottom 22. Alternatively, the lower segment 26 can extend only to an upper surface of the bottom 22 when in the storage configuration such that the lower segment 26 can rotate without interference from the bottom 22, in which case the curved edge 62 and notch 63 are not necessary.

Due to the direction of rotation, i.e., inward rotation, of the side walls 24b and 24d relative to the bottom 22, the curved edge 62 can extend from the bottom 22 and the notch 63 can be formed in the side wall 24b. Alternative lower segment 26 and bottom 22 geometries can be used, though geometries should allow the container 10 to be positioned in a storage configuration and a collapsed configuration.

Figure 11:
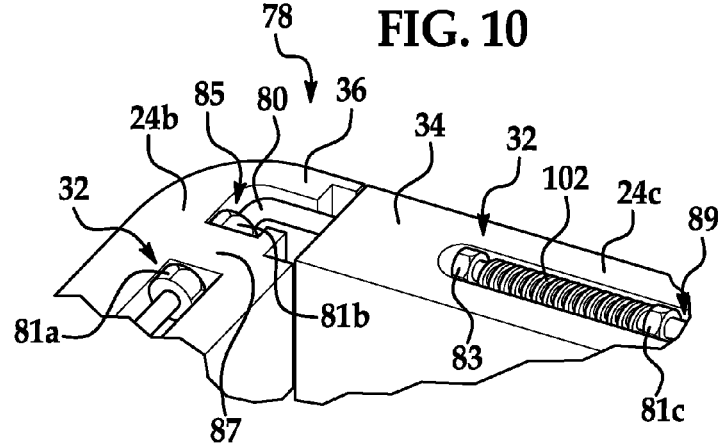
FIG. 11 is a partial perspective view of a joint connecting two adjacent side walls.

FIG. 11 illustrates a joint 78 attaching adjacent side walls, e.g., side walls 24b and 24c as shown. The joint includes an L-shaped bar 80 rotatably coupled to an upper corner 36 of side wall 24b and slidably and rotatably coupled to the upper corner 34 of the other side wall 24c. Regarding the rotatable coupling of the bar 80 to the side wall 24b, the side wall 24b can define an indented channel 85, allowing the bar 80 to be positioned below the top surface 32 of the side wall 24b. The indented channel 85 can widen near the side wall 24c in order to provide a path for the corner 34 of the side wall 24c to move without contacting the side wall 24b during collapsing. A bridge 87 portion of the side wall 24c can span a portion of the channel 85. The bar 80 can be positioned in the channel 85 such that it passes under the bridge 87, and nuts 81a and 81b can be attached to the bar 80 on opposing sides of the bridge 87. The nuts 81a and 81b can prevent the bar 80 from being subject to translation, while still allowing the bar 80 to rotate. Alternatively, other structures, such as a C-clip, can be used to hold the bar 80 relative to the side wall 24b, and the bar 80 can be rotatably coupled to the side wall 24b in another fashion.

In addition, to permit transverse movement of the side wall 24b relative to side wall 24c, the bar 80 can be translated relative to the side wall 24c (though the bar 80 can rotate during the translation). The side wall 24c can define a channel 89. The bar 80 can extend into the channel 89, and a spring 102 can be positioned on the bar 80. A nut 81c can be attached to the bar 80 to hold the spring 102 on the bar 80, and a spacer 83 can be positioned on the opposite side of the spring 102 from the nut 81c. The spacer 83 can be slidable along the bar 80. This attachment method also permits the bar 80 to rotate relative to the side wall 24c. The channel 89 can be covered with a piece of material such as a molded trim plastic piece, tape, or another material for aesthetics and to prevent objects from interfering with the operation of the joint 78. An alternative structure can be used to slidably couple the bar 80 to the side wall 24c.

During movement of the container 10 from the storage configuration to the collapsed configuration, for example, the side wall 24b can rotate relative to the side wall 24c. Since the walls 24b and 24c abut one another in the storage configuration, the walls 24b and 24c should be moved apart from one another to permit the walls 24b and 24c to rotate relative to one another. Without moving the walls 24b and 24c apart from one another before rotation, the corners 36 and 34 of the walls 24b and 24c, respectively, contact one another, hindering movement of the container 10. However, the joint 78 allows the side wall 24b to be moved away from the side wall 24c, as the bar 80 can slide through the channel 89. As the bar 80 slides through the channel 89, the spring 102 can become compressed between the nut 81c and spacer 83, thereby generating a force urging the bar 80 back toward its normal position as shown in FIG. 11. Since the bar 80 is also attached to the side wall 24b, the effect of the spring 102 urging the bar 80 toward its normal position is to pull the side walls 24b and 24c together. With the side walls 24b and 24c sufficiently spaced apart, the side wall 24b can be rotated relative to the side wall 24c. Since the bar 80 is rotatably coupled to the side wall 24b, rotation of the side wall 24b can occur. Following rotation of the side wall 24b, the spring 102 can rebound to pull the side wall 24b into contact with the side wall 24c. Thus, the joint 78 allows the side wall 24b to be moved transversely away from the side wall 24c, allowing the side walls 24b and 24c to be rotated relative to one another without physically interfering with one another.

Joints 78 can be placed between the upper corners of all adjacent side walls 24a-d. Alternatively, a different type of coupling that allows rotation of the side walls 24b and 24c without interference can be used. For example, magnets can be attached to near the corners 36 and 34 of the side walls 24b and 24c, respectively, so that the walls 24b and 24c can be spaced apart for rotation relative to one another while being magnetically pulled toward each other to maintain the general rectangular shape 38 of the side walls 24a-d. Also, no such joint is necessary, as the side walls 24b and 24c can still rotate relative to one another if not coupled by a joint. However, more care is required to fold the side walls 24a-d if no joint is included because the side walls 24a-d are not held in place during folding.

The use of joints 78 connecting all the side walls 24a-d can cause all the side walls 24a-d to rotate together between the collapsed configuration and storage configuration. For example, when the container 10 is between the collapsed and storage configurations as shown in FIG. 6B, the side walls 24a-d are all equally folded. Additionally, since the joints 78 can hold adjacent side walls 24a-d close together, the joints 78 can maintain the rectangular shape 38 generally formed by the top surfaces 32 of the side walls 24a-d of the container 10 regardless of the configuration of the container as shown in FIGS. 6A-C. However, the shape 38 does vary slightly due to the transverse movement permitted by the joints 78 (i.e., the rectangular shape 38 can be slightly elongate if one of the side walls 24a, for example, moved transversely relative to the remaining side walls 24b-d).

Figure 12:
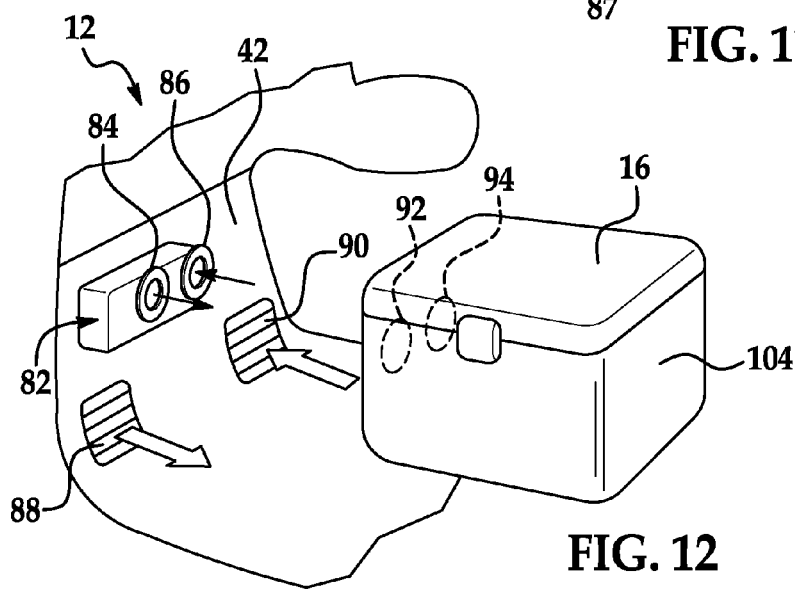
FIG. 12 is a partial perspective view of another embodiment of a container according to the present invention.

FIG. 12 illustrates another embodiment of a container 104 according to the present invention. A thermoelectric device 82 including a fan can be placed inside the interior panel 42 of the vehicle 12. The thermoelectric device 82 can be powered by a vehicle battery and operated by a switch located, for example, on the interior panel 42 or a vehicle console. An inlet vent 90 receives air from the interior compartment 52 of the vehicle 12. The fan forces the air across the thermoelectric device 82, warming or cooling the air. The warmed or cooled air passes through an air output port 84 formed in the interior panel 42 of the vehicle 12. The interior panel 42 also includes an air input port 86. The container 104 includes air receiving opening 92 and an air discharging opening 94. The container 104 can be placed in the interior compartment 52 of the vehicle 12, and the openings 92 and 94 can be engaged with the ports 84 and 86, respectively, to form a generally air-tight path for air. The warmed or cooled air passes from the output port 84 into the container 104 via the opening 92 to maintain the temperature in the container 104 (or to heat or cool the container 104, depending on the relative temperatures of the air in the container 104 and the air exiting the output port 84). As air travels into the container 104, a corresponding amount of air exits the container 104 through the discharge opening 94. The discharged air travels from the container 104 into the input port 86, and then exits into the interior compartment 52 through an outlet vent 88 formed in the interior panel 42.

The container 104 can include additional or alternative features from the above description. The opening 92 and 94 in the container 104 can be closed using, for example, O-ring equipped plugs when the container 104 is not engaged with the vehicle 12. The vents 88 and 90 can be in communication with an air source other than the interior compartment 52, such as the air outside the vehicle 12.

A container according to the present invention can have several advantages over conventional containers. The container 10 can be collapsed to a collapsed configuration to be stowed away, yet still offers protection when in the storage configuration due to its rigid walls. The container 10 can be secured in place by the thermoelectric lid 14 during travel, preventing unintended movement of the container 10 in the vehicle 12. The container 10 can be heated or cooled by the thermoelectric lid 14 for creating a desired temperature within the container. Additional advantages should also be apparent to one of skill in the art.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A collapsible storage container comprising:
    a bottom wall; and
    a plurality of side walls each including a rigid lower segment that is pivotally connected to the bottom wall and is pivotally connected to a rigid upper segment to permit the side wall to fold so that the rigid lower segment and the rigid upper segment form an acute angle or are parallel when the container is collapsed; and
    a plurality of attachment members, each attachment member including an L-shaped bar that is pivotally coupled and restrained from linear sliding with respect to the rigid upper segment of a respective side wall of the plurality of side walls and is pivotally and slidably coupled to the rigid upper segment of an adjacent respective side wall of the plurality of side walls.

2. The collapsible storage container of claim 1, wherein the at least two of the plurality of side walls include an outwardly folding pair of side walls and an inwardly folding pair of side walls.

3. The collapsible storage container of claim 2, wherein the rigid upper segment of each outwardly folding side wall is coupled to the rigid upper segments of both inwardly folding side walls such that ends of the side walls opposite the bottom wall form a rectangular shape when the container is in a collapsed configuration, a storage configuration, and in between the collapsed and storage configurations.

4. The collapsible storage container of claim 1, wherein the side walls include a shell and a thermally insulating material that is disposed within the shell.

5. A collapsible storage container comprising:
    a bottom wall;
    a plurality of side walls pivotally coupled to the bottom wall and pivotally coupled to one another, each side wall comprised of:
        a rigid lower wall segment having a first end pivotally coupled to the bottom wall and a second end spaced apart from the first end, and
        a rigid upper wall segment having a hinged end pivotally coupled to the second end of the lower wall segment and a distal end spaced apart from the hinged end, wherein the distal end is a free end; and
    a joint structure that connects a first side wall of the plurality of side walls to a second side wall of the plurality of side walls, the joint structure including a channel formed in the rigid upper wall segment of the first side wall, a channel formed in the rigid upper wall segment of the second side wall, and an L-shaped bar having a first segment that is positioned within the channel of the rigid upper wall segment of the first side wall and rotatably coupled thereto, and a second segment that is positioned within the channel of the rigid upper wall segment of the second side wall and rotatably and slidably coupled thereto,
    wherein the storage container is configurable in a storage configuration wherein the distal ends of the upper wall segments are positioned a first distance from the bottom wall and a collapsed configuration wherein the distal ends of the upper wall segments are positioned a second distance from the bottom wall, with the second distance being less than the first distance.

6. The collapsible storage container of claim 5, wherein when the storage container is in the storage configuration, an outboard surface of the lower wall segment and an outboard surface of the upper wall segment are substantially parallel; and wherein when the storage container is in the collapsed configuration, the outboard surface of the lower wall segment and the outboard surface of the upper wall segment form an acute angle therebetween.

7. The collapsible storage container of claim 5, wherein an inboard surface of the lower wall segment and an inboard surface of the upper wall segment are substantially parallel to one another and perpendicular to the bottom wall when the storage container is in the storage configuration, and wherein the inboard surface of the lower wall segment and the inboard surface of the upper wall segment form an acute angle therebetween when the storage container is in the collapsed configuration.

8. The collapsible storage container of claim 5, wherein the side walls are thermally insulating.

9. The collapsible storage container of claim 5, wherein when the storage container is in the collapsed configuration, the first end of the lower wall segment and the distal end of the upper wall segment are substantially adjacent to one another.

10. The collapsible storage container of claim 5, wherein at least one of the side walls is an outwardly folding side wall in which the second end of the lower wall segment is located outboard of the first end of the lower wall segment when the storage container is in the collapsed configuration.

11. The collapsible storage container of claim 5, wherein at least one of the side walls is a latching side wall having a latch assembly operable to retain its lower wall segment and upper wall segment in a substantially parallel configuration.

12. The collapsible storage container of claim 11, wherein the latch assembly is disposed on an outboard side of the latching side wall.

13. The collapsible storage container of claim 12, further comprising:
    a hinge connecting the upper wall segment and the lower wall segment of the latching side wall, the hinge having an axis of rotation aligned with an interior surface of the latching side wall when the storage container is in the storage configuration.

14. The collapsible storage container of claim 12, further comprising:
  a hinge connecting the upper wall segment and the lower wall segment of the latching side wall, the hinge having an axis of rotation inboard of an interior surface of the latching side wall when the storage container is in the storage configuration.

15. A collapsible storage container comprising:
  a bottom wall;
  a plurality of side walls pivotally coupled to the bottom wall and pivotally coupled to one another, each side wall comprised of a rigid lower wall segment pivotally coupled to the bottom wall and a rigid upper wall segment pivotally coupled to the rigid lower wall segment; and
  a joint structure that connects a first side wall of the plurality of side walls to a second side wall of the plurality of side walls, the joint structure including a channel formed in the rigid upper wall segment of the first side wall, a channel formed in the rigid upper wall segment of the second side wall, and an L-shaped bar having a first segment that is positioned within the channel of the rigid upper wall segment of the first side wall and rotatably coupled thereto, and a second segment that is positioned within the channel of the rigid upper wall segment of the second side wall and rotatably and slidably coupled thereto,
  wherein the storage container is movable between a storage configuration and a collapsed configuration.

16. The collapsible storage container of claim 15, wherein the storage container moves between the storage configuration and the collapsed configuration by pivotal movement of the rigid lower wall segments with respect to the bottom wall and pivotal movement of the rigid upper wall segments with respect to the rigid lower wall segments.

17. The collapsible storage container of claim 15, wherein the side walls are thermally insulating.

18. The collapsible storage container of claim 15, wherein at least one of the side walls is a latching side wall having a latch assembly operable to retain its rigid lower wall segment and rigid upper wall segment in a substantially parallel configuration when the storage container is in the storage configuration.

19. The collapsible storage container of claim 18, further comprising:
  a hinge connecting the upper wall segment and the lower wall segment of the latching side wall, the hinge having an axis of rotation aligned with an interior surface of the latching side wall when the storage container is in the storage configuration.

20. The collapsible storage container of claim 18, further comprising:
  a hinge connecting the upper wall segment and the lower wall segment of the latching side wall, the hinge having an axis of rotation inboard of an interior surface of the latching side wall when the storage container is in the storage configuration.

21. The collapsible storage container of claim 15, further comprising:
  a biasing member positioned in the channel of the rigid upper wall segment of the second side wall in engagement with the second segment of the L-shaped bar to bias the sliding movement of the second segment of the L-shaped bar such that the rigid upper wall segment of the second side wall and the rigid upper wall segment of the first side wall are biased toward engagement with one another during rotational movement of the L-shaped bar with respect to the rigid upper wall segment of the second side wall and the rigid upper wall segment of the first side wall as the container moves between the collapsed configuration and the storage configuration.

* * * * *